Figure 3:
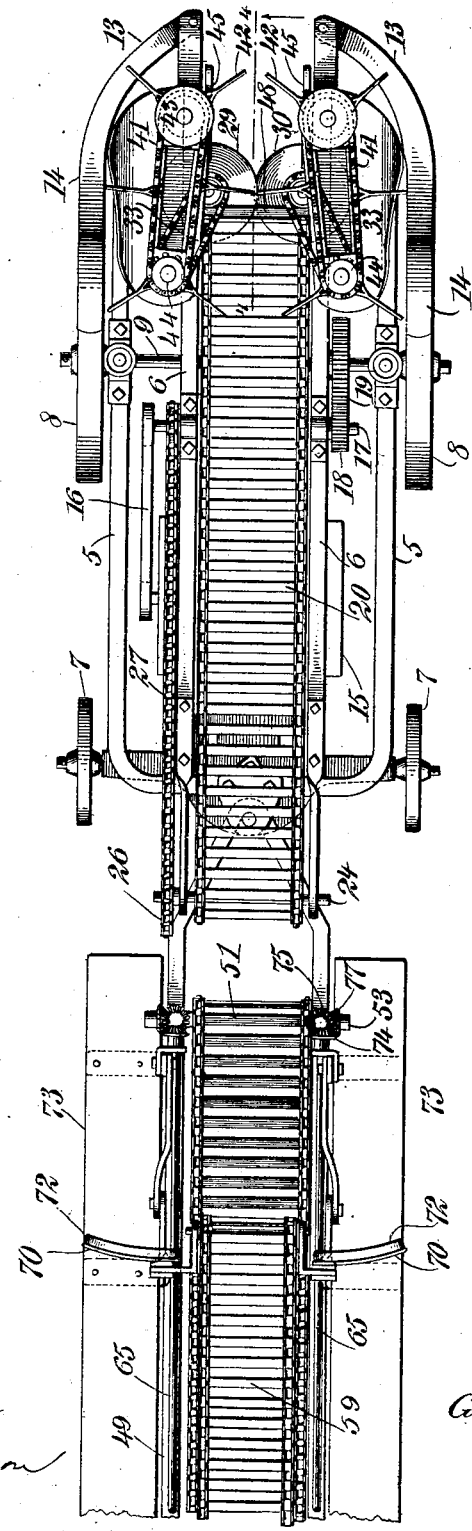

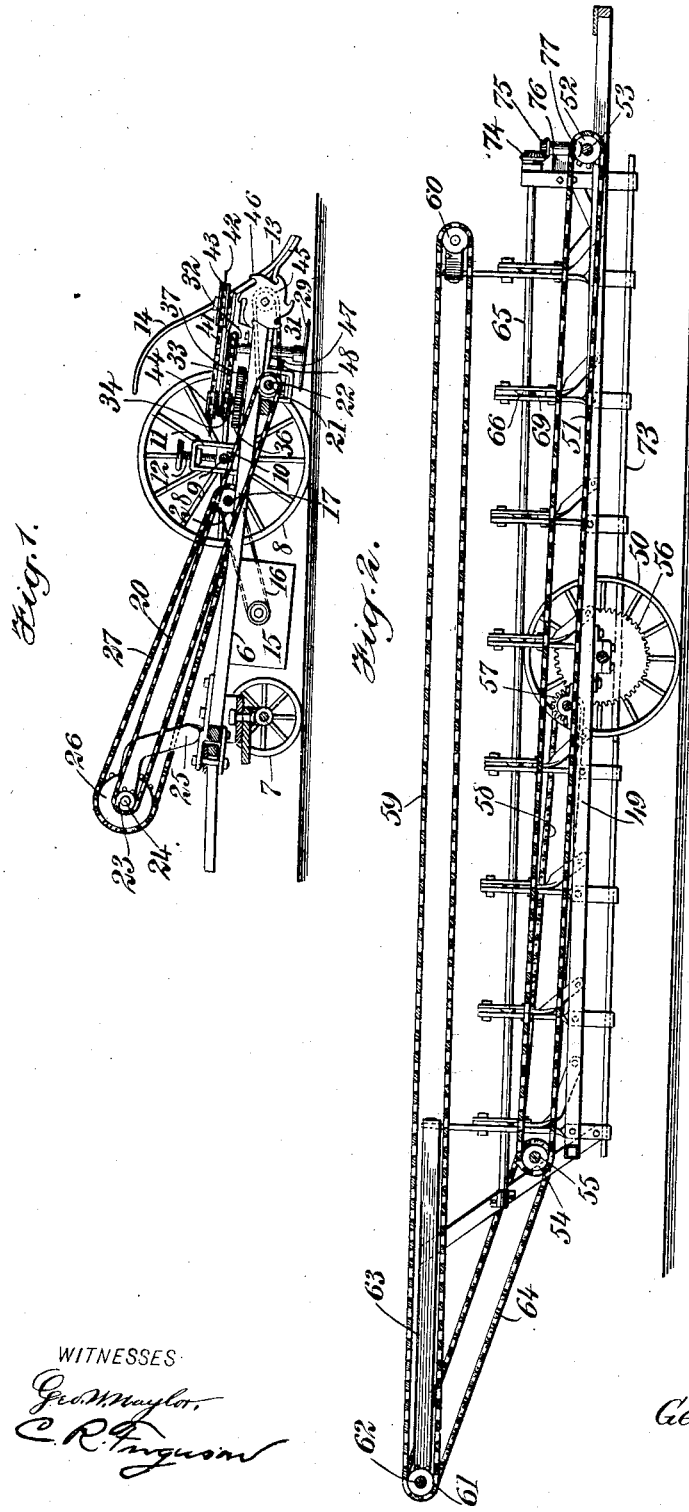

No. 762,073. PATENTED JUNE 7, 1904.
G. D. LUCE.
HARVESTER.
APPLICATION FILED MAY 9, 1903.
NO MODEL. 3 SHEETS—SHEET 2.

WITNESSES:

INVENTOR
George D. Luce
BY
ATTORNEYS.

No. 762,073. PATENTED JUNE 7, 1904.
G. D. LUCE.
HARVESTER.
APPLICATION FILED MAY 9, 1903.
NO MODEL. 3 SHEETS—SHEET 3.
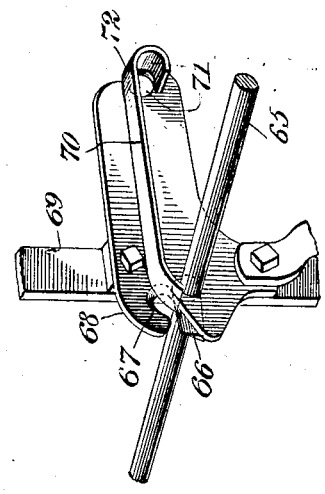
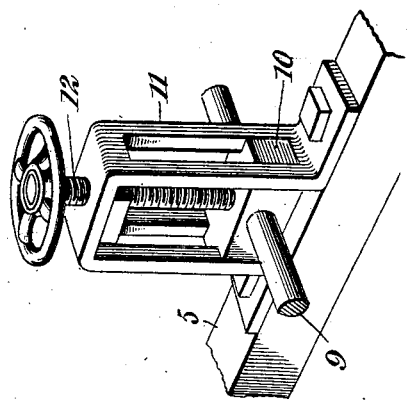
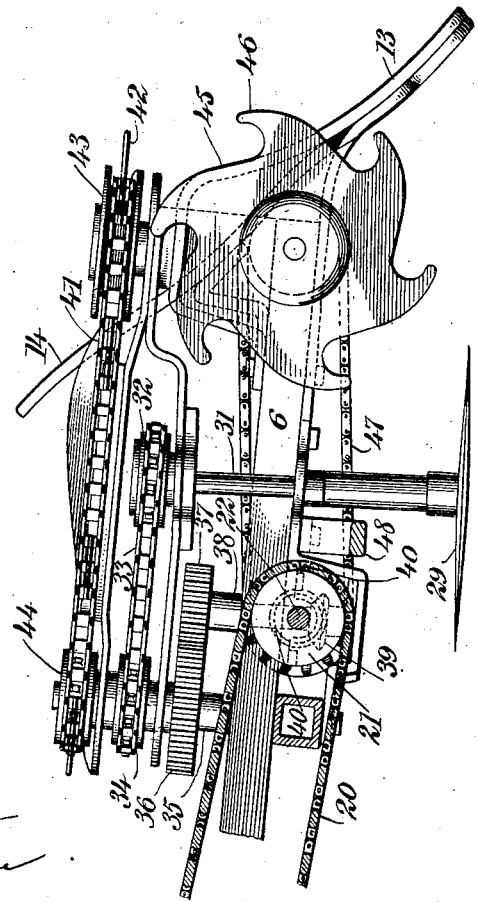
WITNESSES:
INVENTOR
George D. Luce
BY
ATTORNEYS.

No. 762,073.

Patented June 7, 1904.

UNITED STATES PATENT OFFICE.

GEORGE D. LUCE, OF NEW ORLEANS, LOUISIANA.

HARVESTER.

SPECIFICATION forming part of Letters Patent No. 762,073, dated June 7, 1904.

Application filed May 9, 1903. Serial No. 156,489. (No model.)

*To all whom it may concern:*

Be it known that I, GEORGE D. LUCE, a citizen of the United States, and a resident of New Orleans, in the parish of Orleans and State of Louisiana, have invented a new and Improved Harvester, of which the following is a full, clear, and exact description.

This invention relates to improvements in sugar-cane harvesters, an object being to provide a motor-operated machine of novel construction that may be employed for cutting cane for planting or windrowing purposes and that may be arranged for topping, stripping, and loading the cane when the cane is to be sent to the mill.

I will describe a cane-harvester embodying my invention and then point out the novel features in the appended claims.

Reference is to be had to the accompanying drawings, forming a part of this specification, in which similar characters of reference indicate corresponding parts in all the figures.

Figure 1 is a sectional elevation of a cane-harvester embodying my invention. Fig. 2 is a sectional elevation of the topping, stripping, and loading attachment. Fig. 3 is a plan view of the harvester. Fig. 4 is a section on the line 4 4 of Fig. 3. Fig. 5 is a perspective view showing the topping and stripping device employed, and Fig. 6 is a perspective view of one of the devices for vertically adjusting the front end of the machine to regulate the height of the cutters from the ground.

I will first describe the operation of the harvester for cutting cane. It comprises a frame consisting of outer longitudinal bars 5 and inner longitudinal bars 6. The frame is supported at the rear end on wheels 7, which have suitable connection therewith so that by any suitable devices the machine may be steered. The frame is supported near its forward end by wheels 8. These supporting-wheels 8 are rigidly attached to an axle 9, which has bearings in blocks 10, movable vertically in guides 11, supported on the rails 5. Screws 12 pass through the top walls of the guides 11 and bear on the upper sides of the blocks. By raising the screws it is obvious that the front end of the frame will move downward, and by a reverse movement of the screws the end of the frame will be permitted to move upward.

Extended at downward and inward curves from the front ends of the frame are dividers 13, which have rearward upward extensions 14, forming guards over the wheels 8.

Mounted on the frame is a motor 15, which may be of the combustion type of engine, and from the shaft of this motor a band 16 extends to a pulley on a counter-shaft 17, and on this counter-shaft is a pinion 18, engaging with a gear-wheel 19 on the axle 9. By this construction it is obvious that when the motor is in operation the machine will be moved forward.

From the forward portion of the frame a conveyer 20 extends rearward at an upward angle. This endless conveyer comprises sprocket-chains engaging sprocket-wheels 21 on a shaft 22 at the forward end and then over sprocket-wheels 23, the shaft 24 of which has bearings in uprights 25 on the rear end of the machine-frame, and from a sprocket-wheel 26 on the shaft 24 a driving-chain 27 extends to a sprocket-wheel 28 on the shaft 17.

Arranged between the frame portions 13 near the forward end are cane-cutting disks 29 and 30, which are arranged to rotate on a horizontal plane and slightly lap one over the other. Each disk is mounted on a vertical shaft 31, on the upper end of which is a sprocket-wheel 32, from which a chain 33 extends to a sprocket-wheel 34 on the upper end of a shaft 35. On the shaft 35 is a gear-wheel 36, meshing with a gear-wheel 37 on a vertical shaft 38, the lower end of which is provided with a bevel-gear 39, meshing with a bevel-gear 40 on the shaft 22.

The feeding devices consist of bands or chains 41, from which fingers 42 extend outward. The chain extends around a pulley 43, supported at the front end of the frame, and thence around a sprocket-wheel 44 on the upper end of the shaft 35. Operating below the forward ends of the feeding devices are take-up wheels 45, having hook-shaped fingers 46. These wheels are designed to pick up or straighten up cane that may be lying crosswise of the machine. On the shaft of each take-up wheel is a sprocket wheel or pinion from which a chain 47 extends to a sprocket-wheel on the shaft 22. To prevent the cane from striking or pressing too hard against the endless carrier 20, a fender-bar 48 is placed in front of it.

I will now describe the device for topping, stripping, and loading the cane received from the main or cutting machine. This device is coupled to the rear end of the cutting-machine and is drawn along as a trailer. It comprises a frame 49, supported at about the center on wheels 50. Extended longitudinally of the frame is an endless carrier 51, the chains of which pass around sprocket-wheels 52 on a front shaft 53 and thence around sprocket-wheels 54 on a rear shaft 55. Motion is imparted to this endless carrier 51 from the axle of the wheels 50. As here shown, a gear-wheel 56 is attached to the axle and meshes with a pinion 57, on the shaft of which is a sprocket-wheel from which a chain 58 extends to a connection with the sprocket-wheel on the shaft 55. Arranged above the carrier 51 is another endless carrier 59, which extends around rollers 60 near the front end of the frame and thence around sprocket-wheels 61, attached to a shaft 62, having bearings in arms 63, extended from standards at the rear end of the frame 49. It will be noted that these arms 63 extend considerably rearward of the frame, so that a cart may be drawn underneath the same to receive the material discharged from the carrier. This carrier 59 is operated by a chain 64, driven from the shaft 55 and engaging with a sprocket-wheel on the shaft 62.

Arranged at each side of the machine and extended longitudinally thereof is a topping-shaft 65, and each shaft 65 carries a plurality of topping-blades 66, which coact with hook-like blades 67, formed in a plate 68, attached to uprights 69 on the side of the frame. Extended outward from each upright 69 is a stripping-plate 70, having a hole 71, into which the cane is to be thrust to remove the leaves that may be thereon, and extended partly around the hole 71 is a guide-plate 72. By extending the plates 70 outward or laterally from the sides of the frame the stripping-holes are more conveniently placed for the manipulation of the cane by a person standing on the running-boards 73 than would be the case were the plates having the holes extended directly upward from or over the frame.

In the operation as the machine is drawn along the cane passing between the dividers 13 will be fed to the rotary cutters 29 and 30 by the fingers 42. As before mentioned, the wheels 45 will pick and straighten up cane that may be lying down. The cut cane will fall onto the conveyer 20, from which it will fall to the conveyer 51. The boy or man standing on the running-board 73 will pick up the cane singly and hold the upper ends thereof in position for the operation of the topping-blades 66 67. After this the stalk of cane is to be thrust into the hole 71 to strip off the leaves. Then the topped and stripped cane is placed upon the conveyer 59, which carries it to the cart at the rear end.

Motion is imparted to the shaft 65 from the movements of the conveyer 51. The forward end of each shaft 65 is provided with a bevel-pinion 74, engaging a bevel-pinion 75 on a vertical shaft 76, on the lower end of which is a bevel-pinion engaging with a bevel-pinion 77 on the shaft 53.

As has been before remarked, when the machine is employed only for cutting cane or windrowing the cane the trailer is to be detached.

Having thus described my invention, I claim as new and desire to secure by Letters Patent—

1. A cane-harvester comprising a frame, rear and front wheels supporting the frame, downwardly and inwardly curved dividers at the forward portion of the frame, guards extended from said dividers, over the front wheels, an endless carrier on the frame, cutting-disks arranged forward of the carrier and mounted to rotate in a horizontal plane, and devices for feeding cane to the cutters.

2. A cane-harvester comprising a vehicle, a motor on the vehicle and operating to move the same, an endless carrier on the vehicle, driving connections between the motor and carrier, rotary cutting-disks forward of the carrier, toothed pick-up wheels forward of the cutters, endless band-feeding devices above the cutters, and gear-driving connections between the endless carrier and said cutters and feeders.

3. A cane-harvester comprising a wheeled vehicle, a driving-motor supported thereon, an endless carrier operated from the motor, rotary cutting-disks forward of the carrier and operated from the motor, endless band-feeders arranged over the cutters and operated from the motor, and toothed pick-up wheels, operated from the motor.

In testimony whereof I have signed my name to this specification in the presence of two subscribing witnesses.

GEORGE D. LUCE.

Witnesses:
  E. E. ADAMS,
  MILSON J. LUCE.